United States Patent
Benner et al.

(10) Patent No.: US 7,490,514 B2
(45) Date of Patent: Feb. 17, 2009

(54) LEVEL SENSOR COMPRISING A FLOAT FOR DETERMINING A FUEL LEVEL IN A FUEL TANK, AND KIT FOR SUCH A LEVEL SENSOR

(75) Inventors: Hans-Guenter Benner, Kriftel (DE); Bernd Pauer, Eppstein (DE); Robert Peter, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 184 days.

(21) Appl. No.: 10/585,896

(22) PCT Filed: Dec. 17, 2004

(86) PCT No.: PCT/EP2004/053583

§ 371 (c)(1),
(2), (4) Date: Jul. 12, 2006

(87) PCT Pub. No.: WO2005/068946

PCT Pub. Date: Jul. 28, 2005

(65) Prior Publication Data

US 2007/0151338 A1    Jul. 5, 2007

(30) Foreign Application Priority Data

Jan. 16, 2004  (DE) ................ 10 2004 002 461

(51) Int. Cl.
*G01F 23/30* (2006.01)
(52) U.S. Cl. ............................................. 73/305
(58) Field of Classification Search .......... 73/290 R, 73/313, 317; 338/33
See application file for complete search history.

(56) References Cited

U.S. PATENT DOCUMENTS

| | | | | |
|---|---|---|---|---|
| 4,641,122 A | * | 2/1987 | Hennequin | .......... 338/33 |
| 4,671,121 A | | 6/1987 | Schieler | |
| 5,152,170 A | | 10/1992 | Liu | |
| 6,089,086 A | * | 7/2000 | Swindler et al. | .......... 73/317 |
| 6,276,201 B1 | | 8/2001 | Gette et al. | |
| 6,305,220 B1 | * | 10/2001 | Brunel | .......... 73/317 |

(Continued)

FOREIGN PATENT DOCUMENTS

CN    1414352    4/2003

(Continued)

OTHER PUBLICATIONS

German Translation of Chinese Office Action Dated Sep. 28, 2007, 10 pages.

(Continued)

*Primary Examiner*—Hezron Williams
*Assistant Examiner*—Michael Le Boulluec
(74) *Attorney, Agent, or Firm*—Cohen Pontani Lieberman & Pavane LLP

(57) ABSTRACT

Disclosed is a level sensor (7) for a fuel tank (1), comprising a holding part (11) that can be mounted in different positions on a support (13). The support (13) is fastened to a swirl pot (4) while the holding part (11) bears a lever arm (8) that supports a float (9). The inventive level sensor (7) can be adjusted to different fuel tank dimensions by mounting said level sensor (7) differently on the support (13).

14 Claims, 3 Drawing Sheets

U.S. PATENT DOCUMENTS

| | | |
|---|---|---|
| 6,578,417 B1 * | 6/2003 | Eck .............................. 73/305 |
| 6,595,239 B1 | 7/2003 | Korst et al. |
| 6,880,398 B2 | 4/2005 | Okamoto |
| 2003/0074965 A1 | 4/2003 | Okamoto |
| 2007/0125344 A1 * | 6/2007 | Troxler et al. ............... 123/509 |

FOREIGN PATENT DOCUMENTS

| | | |
|---|---|---|
| DE | 44 11 961 A1 | 10/1995 |
| DE | 297 21 952 U1 | 5/1998 |
| DE | 197 51 210 A1 | 5/1999 |
| DE | 199 56 217 A1 | 5/2001 |
| EP | 0 987 136 A2 | 3/2000 |
| EP | 1 304 474 A1 | 4/2003 |
| FR | 2.060.346 A | 6/1971 |
| JP | 62175623 | 8/1987 |
| JP | 2002168675 | 6/2002 |

OTHER PUBLICATIONS

Letter and English language comments regarding Chinese Office action of Sep. 28, 2007, 1 page.

* cited by examiner

LEVEL SENSOR COMPRISING A FLOAT FOR DETERMINING A FUEL LEVEL IN A FUEL TANK, AND KIT FOR SUCH A LEVEL SENSOR

BACKGROUND OF THE INVENTION

The invention relates to a level sensor for determining a fuel level in a fuel tank of a motor vehicle, with a support provided for fastening in the fuel tank, with a holding part connected to the support, with a mounting, which is arranged on the holding part, for a lever arm supporting a float, and with fastening means arranged on the holding part and the support. Furthermore, the invention relates to a kit for such a level sensor.

In the case of fuel tank level sensors known from practice, the support is fastened to a swirl pot prestressed against the base of the fuel tank. The holding part is latched to the support during installation. The problem exists in this case of keeping in stock, for differently shaped fuel tanks, different level sensors, in which, for example, the lever arm can be fitted to the left or to the right. This requires a high multiplicity of parts to be kept in stock for different level sensors.

The invention is based on the problem of designing a level sensor of the type mentioned at the beginning, in such a manner that it can be fitted with particularly few components in differently designed fuel tanks. Furthermore, the invention is based on the problem of providing a kit for such a level sensor, which kit can be used with as few components as possible in different fuel tanks.

BRIEF DESCRIPTION OF THE INVENTION

The first-mentioned problem is solved according to the invention in that the fastening means of the holding part correspond with the fastening means of the support in positions of the holding part in which it is rotated about a horizontal axis and about a vertical axis.

By means of this design, the holding part, if it serves for fastening to the support, is of symmetrical design and can be fitted in a simple manner to the support in four different positions. Therefore, the holding part and therefore the mounting of the lever arm can be fitted in the appropriate alignment to the support as a function of the particular dimensions of the fuel tanks. This results in a sharp reduction in the number of components of the level sensor according to the invention that are to be kept in stock. The components of the level sensor can therefore be used in differently shaped fuel tanks without reworking. Owing to the invention, the components of the level sensor according to the invention are designed as identical parts for different fuel tanks and can therefore be manufactured particularly cost-effectively in the large batch customary for fuel tanks.

In the very simplest case, the fastening means of the holding part could be holes which pass through the holding part and which correspond in every position to the fastening means designed, for example, as latching hooks. However, according to an advantageous development of the invention, continuous holes can be avoided in a simple manner if a front side and a rear side of the holding part each have identical fastening means.

A potentiometer or magnetically active position sensor of the level sensor according to the invention is reliably protected against damage if the holding part has two housing parts which can be connected to each other, with one of the housing parts according to choice forming the front side and the other of the housing parts according to choice forming the rear side of the holding part.

According to another advantageous development, the lever arm is reliably guided in the holding part if the lever arm has a clip of plastic and a lever wire which is fastened to the clip and supports the float, and if the clip is mounted in both housing parts of the holding part.

According to another advantageous development, contact breakers on a potentiometer or fluctuating distances of a magnet of the magnetically active position sensor can be reliably avoided if one of the housing parts of the holding part has a receptacle for a resistance network of a magnetically active position sensor or a thick-film network of a potentiometer and the other housing part has a slideway for the lever arm.

A high resistance of the level sometimes indicates an empty fuel tank and sometimes a filled fuel tank. The level sensor according to the invention permits a simple adaptation to the fuel tank provided if the receptacle is formed symmetrically with respect to the rotatable installation of the resistance network of the magnetically active position sensor or of the thick-film network of a potentiometer.

An angled portion of the lever wire could be designed, for example, as a bearing spindle of the lever arm. However, according to another advantageous development of the invention, friction due to different swelling behavior between the metal of the lever wire and the clip manufactured from plastic and the holding part can be avoided in a simple manner if the lever wire has an angled portion which is introduced into a recess of the clip, and if the recess of the clip is arranged outside the housing parts of the holding part and at a distance from the mounting of the clip. A further advantage of this design is that the lever wire can be fitted and removed together with the float from the outside. The level sensor according to the invention does not have to be dismantled for this.

According to another advantageous development of the invention, the installation of the holding part on the support is simplified if the support of the two housing parts of the holding part has arms at least partially engaging around it and a stop for supporting the holding part.

The level sensor according to the invention can be fitted in a particularly simple manner if the fastening means of the support and of the holding part are designed as latching hooks and latching recesses.

The installation of the level sensor according to the invention is further simplified if the housing parts have latching means for their connection to one another.

The level sensor according to the invention turns out to be particularly compact if the lever wire is guided via the holding part.

The second-mentioned problem, namely the provision of a kit for the above mentioned level sensor which can be used with as few components as possible in different fuel tanks is solved, according to the invention, in that two clips are provided, one of the clips having, on its side facing away from a magnet of the position sensor or a contact of the potentiometer, a bent portion for securing the lever wire, and the other clip having the bent portion on the opposite side.

By means of this design, in the case of specially shaped fuel tanks the clip can be exchanged in a simple manner and the lever arm can be guided away from the holding part in the designated direction. Owing to the invention, in addition to the housing parts of identical construction and identical potentiometers or magnetically active position sensors and the two clips, only the lever wire has to be matched to the different dimensions of the fuel tank. The kit therefore requires particularly few components for different fuel tanks.

BRIEF DESCRIPTION OF THE DRAWINGS

The invention permits numerous embodiments. To further clarify its basic principle, one of these is illustrated in the drawing and is described below. In the drawing.

DETAILED DESCRIPTION OF THE INVENTION

Figure 1:
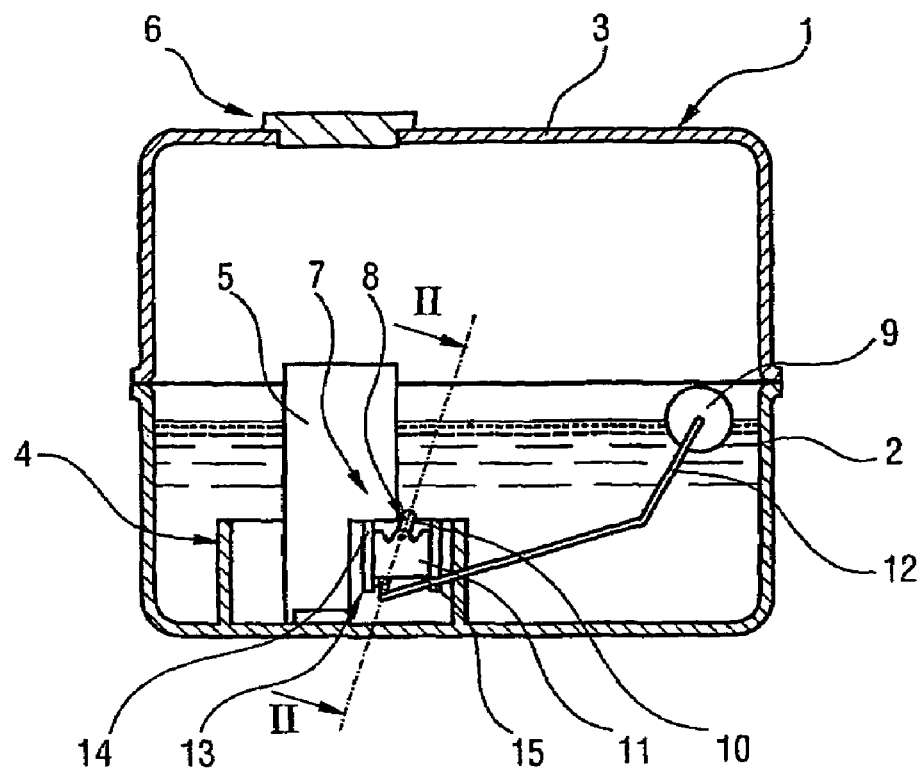
FIG. 1 shows, diagrammatically, a sectional illustration through a fuel tank with a level sensor according to the invention arranged therein.

FIG. 1 shows a fuel tank 1 with two half-shells 2, 3 welded to each other and a swirl pot 4 prestressed against the base region of the half-shell 2. The upper half-shell 3 has an opening 6 provided for introducing a fuel pump 5 into the fuel tank 1. The fuel pump 5 is prestressed against the base of the fuel tank 1 and sucks up fuel from the swirl pot 4. Furthermore, the fuel tank I has a level sensor 7 with a float 9 fastened to a lever arm 8. The lever arm 8 is mounted pivotably in a clip 10, which is manufactured from plastic, on a holding part 11, which is fastened to the outside of the swirl pot 4, and supports the float 9 by means of a lever wire 12. The float 9 follows a fuel level in the fuel tank 1 and pivots the lever arm 8. The holding part 11 is latched to a support 13 fastened on the swirl pot 4. The support part 13 has lateral arms 14 engaging around the holding part 11 and a stop 15 for supporting the holding part 11. To install the level sensor 7, the holding part 11, which is pre-assembled with the lever arm 8, is pushed into the support 13 from above and is latched therein.

Figure 2:
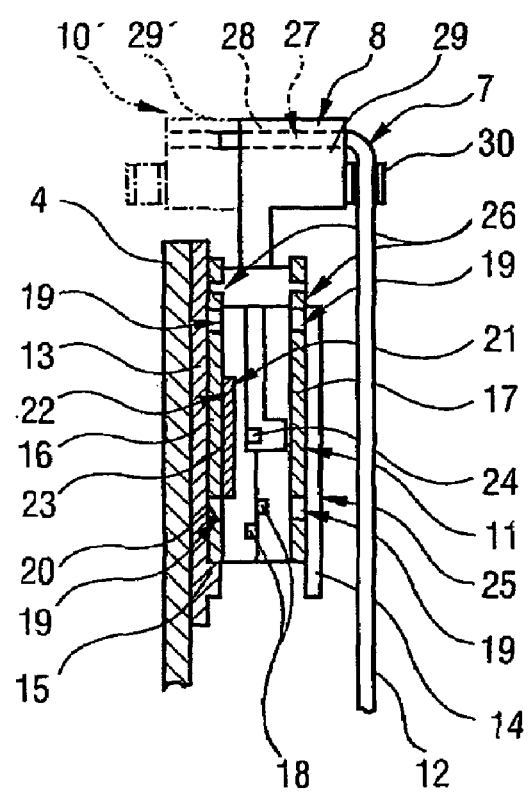
FIG. 2 shows an enlarged sectional illustration through the level sensor from FIG. 1 along the line II-II.

FIG. 2 shows, on an enlarged scale, the level sensor 7 from FIG. 1 in a sectional illustration along the line II-II. The holding part 11 has two housing parts 16, 17 which are connected to each other via latching means 18. The housing parts 16, 17 of the holding part 11 have fastening means 19 which are designed as recesses and correspond to fastening means 20, designed as latching hooks, of the support 13. The fastening means 19, designed as recesses, of the holding part 11 are arranged at a total of four points on the housing parts 16, 17. The holding part 11 can therefore be rotated about its horizontal axis and about its vertical axis and can therefore be fastened to the support 13 in four different positions.

The pivoting angle of the lever arm 8 is detected by a magnetically passive position sensor 21. One of the housing parts 16 has a receptacle 22 for a resistance network 23 of the position sensor 21. The clip 10 supports a magnet 24 of the position sensor 21. On its side facing away from the magnet 24, the clip 10 is at a short distance opposite a slideway 25. A mounting 26 of the clip 10 is arranged in the vicinity of an edge of the two housing parts 16, 17 and supports the clip 10 in its central region. Furthermore, FIG. 2 shows that, at its end protruding out of the holding part 11, the clip 10 has a recess 27 for receiving an angled portion 28 of the lever wire 12 and a bent portion 29 with a clip connection 30 for securing a section of the lever wire 12 which is guided parallel to the clip 10.

A second embodiment of the clip 10' permitting the lever wire 12 to be fastened on the inside of the swirl pot 4 is illustrated by chain-dotted lines in FIG. 2. This clip 10' has a bent portion 29' for securing the lever wire 12 on the side facing the resistance network 23 of the position sensor 21.

Figure 3:
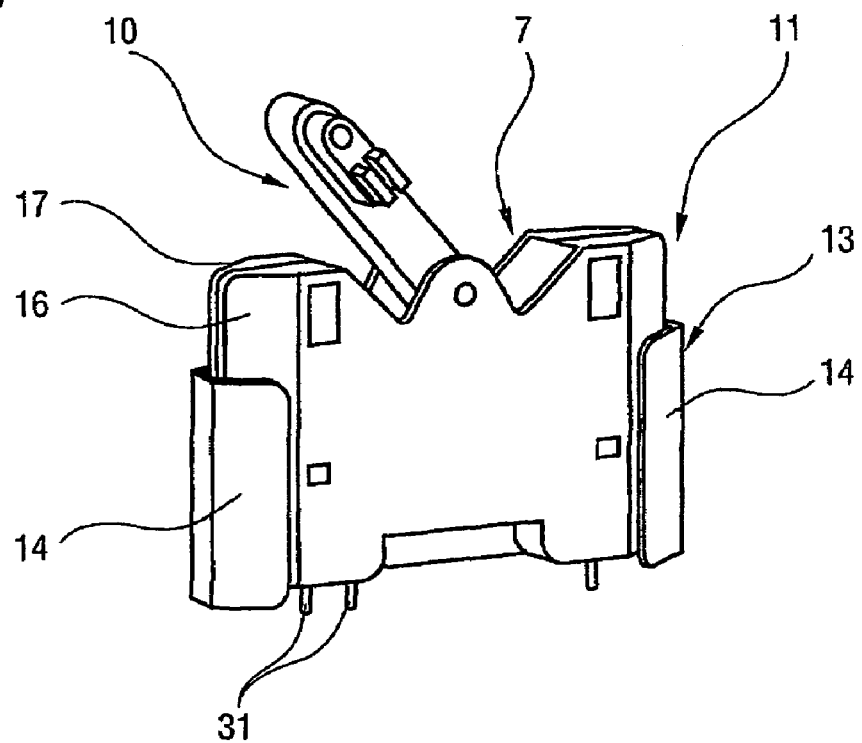
FIG. 3 shows the level sensor from FIG. 1 in a perspective illustration.

FIG. 3 shows the level sensor 7 from FIG. 1 in a perspective illustration. Contacts 31 for connection with the position sensor 21 illustrated in FIG. 2 are arranged on the rear housing part 16.

Figure 4:
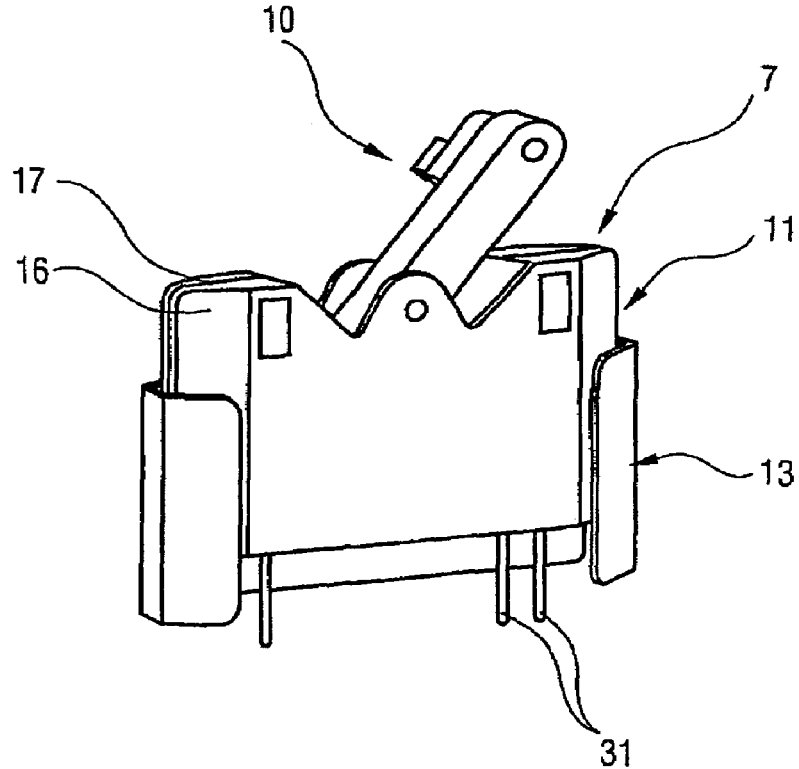
FIGS. 4-6 a perspective illustrations of the level sensor in different installation positions.

The holding part 11 of the level sensor 7 can be fastened rotated about its vertical axis on the support 13, so that the housing part 16 which has the contacts 31 of the position sensor 7 is at the front. This position is illustrated in FIG. 4.

Figure 5:
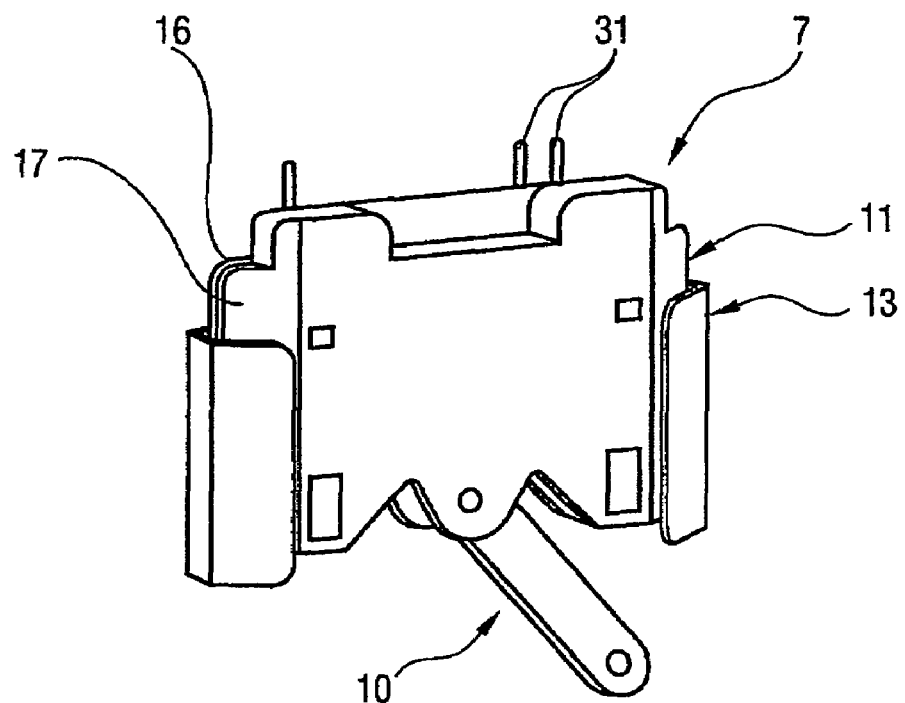

FIG. 5 shows the level sensor 7 from FIG. 3 after the holding part 11 is installed, rotated about its horizontal axis, on the support 13. The housing parts 16, 17 are thereby rotated in such a manner that contacts 31 for connecting the position sensor 21 are arranged on the rear of the housing part 16 and point upward.

Figure 6:
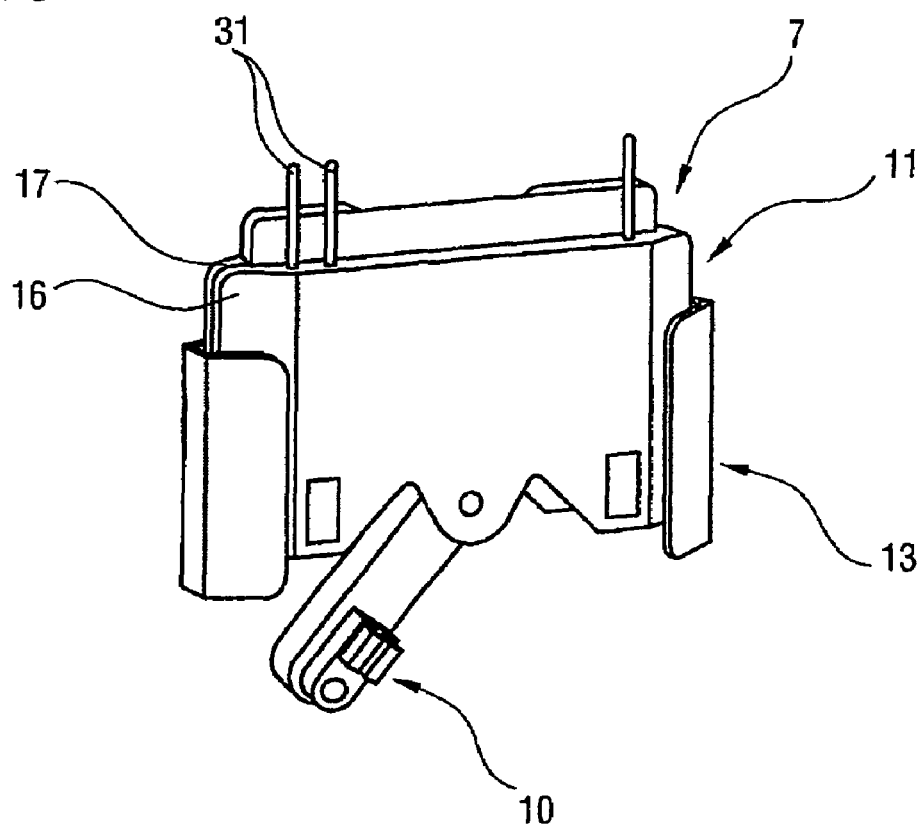

FIG. 6 shows the level sensor 7 from FIG. 5 after the holding part 11 has been installed, rotated about the vertical axis, on the support 13. It can be seen here that the contacts 31 for connecting the position sensor 21 are arranged on the front housing part 16 and point upward.

FIGS. 3 to 6 therefore illustrate four different possibilities for installing the level sensor 7 as a function of the dimensions of the fuel tank 1 illustrated in FIG. 1. To further increase the possibilities of installing the level sensor 7, the clip 10 can be replaced by the clip 10' illustrated by chain-dotted lines in FIG. 2. By exchanging the clip 10, 10', the number of possible alignments of the level sensor 7 rises to a total of eight.

The invention claimed is:

1. A level sensor for determining a fuel level in a fuel tank of a motor vehicle, comprising:
    a support configured for fastening the level sensor inside the fuel tank,
    a holding part connected to the support,
    a mounting arranged on the holding part,
    a float,
    a lever arm supporting the float, and
    fastening means arranged on the holding part and the support,
    wherein the fastening means of the holding part correspond with the fastening means of the support in at least two different relative positions of the holding part when the holding part is rotated about at least one of a horizontal axis and a vertical axis so that the holding part is selectively connectable to the support in each of the at least two different relative positions.

2. The level sensor as claimed in claim 1, wherein a front side and a rear side of the holding part each have identical fastening means.

3. The level sensor as claimed in claim 2, wherein the holding part comprises two housing parts which can be connected to each other, with one of the housing parts forming the front side and the other of the housing parts forming the rear side of the holding part.

4. The level sensor as claimed in claim 3, wherein the lever arm comprising a clip of plastic and a lever wire which is fastened to the clip supports the float, and the clip is mounted in both housing parts of the holding part.

5. The level sensor as claimed in claim 3, wherein one of the housing parts of the holding part comprises a receptacle for a resistance network of a magnetically active position sensor or a thick-film network of a potentiometer and the other housing part comprises a slideway for the lever arm.

6. The level sensor as claimed in claim 5, wherein the receptacle is formed symmetrically with respect to a rotatable installation of the resistance network of the magnetically active position sensor or of the thick-film network of a potentiometer.

7. The level sensor as claimed in claim 4, wherein the lever wire comprises an angled portion which is introduced into a recess of the clip, and the recess of the clip is arranged outside the housing parts of the holding part and at a distance from the mounting of the clip.

8. The level sensor as claimed in claim 3, wherein the support of the two housing parts of the holding part comprises lateral arms at least partially engaging around the support and a stop for supporting the holding part.

9. The level sensor as claimed in claim 1, wherein the fastening means of the support and of the holding part are designed as latching hooks and latching recesses.

10. The level sensor as claimed in claim 3, wherein the housing parts comprise latching means for connecting to each other.

11. The level sensor as claimed in claim 4, wherein the lever wire is guided via the holding part.

12. A kit for a level sensor as claimed in claim 6, comprising:
    two clips, one of the clips comprising, on its side facing away from a magnet of the position sensor or a contact of the potentiometer, a bent portion for securing the lever wire, and the other clip comprising a bent portion on the opposite side.

13. The level sensor as claimed in claim 1, wherein the support is disposed entirely inside the fuel tank to fasten the level sensor entirely inside the fuel tank.

14. The level sensor as claimed in claim 1, wherein the at least two relative positions correspond to rotation of the holding part to 0 or 180 degrees relative to the support about at least one of the horizontal axis and the vertical axis.

* * * * *